United States Patent [19]
Walsh

[11] Patent Number: 5,622,480
[45] Date of Patent: Apr. 22, 1997

[54] SUCTION SET RETAINER

[75] Inventor: Warren J. Walsh, Buffalo, Minn.

[73] Assignee: Wagner Spray Tech Corporation, Minneapolis, Minn.

[21] Appl. No.: 517,919

[22] Filed: Aug. 22, 1995

[51] Int. Cl.[6] .................................................. F04B 53/00
[52] U.S. Cl. .......................................... 417/234; 417/313
[58] Field of Search .................................. 417/313, 234; 248/67.7, 301, 304, 339

[56] References Cited

U.S. PATENT DOCUMENTS

| | | | |
|---|---|---|---|
| 2,966,320 | 12/1960 | Schoepe et al. | 248/75 |
| 3,119,587 | 1/1964 | Anderson | 248/75 |
| 3,433,415 | 3/1969 | Enssle | 417/234 |
| 4,715,402 | 12/1987 | Staun et al. | 137/355.17 |
| 4,903,922 | 2/1990 | Harris, III | 248/301 |
| 5,005,790 | 4/1991 | Harris, III | 248/301 |
| 5,213,480 | 5/1993 | Yedinak et al. | 417/234 |
| 5,217,238 | 6/1993 | Cyphers et al. | 417/234 |
| 5,292,232 | 3/1994 | Krohn et al. | 417/234 |
| 5,507,460 | 4/1996 | Schneider | 248/304 |

Primary Examiner—Timothy Thorpe
Assistant Examiner—Peter G. Korytnyk
Attorney, Agent, or Firm—Faegre & Benson

[57] ABSTRACT

Apparatus for retaining an elongated flexible suction set to a portable paint pump includes a pair of hooks, with one hook extending from a handle of the pump to releasably secure an intermediate portion of a hose of the suction set to the pump and another hook mounted on intermediate portion of the hose to releasably secure a distal end of the hose to the intermediate portion thereof.

18 Claims, 3 Drawing Sheets

SUCTION SET RETAINER

FIELD OF THE INVENTION

This invention relates to the field of portable paint spraying equipment, and in one embodiment, to portable paint pumps for airless spraying where paint is drawn via an extended suction set from, for example, a 5 gallon bucket.

BACKGROUND OF THE INVENTION

In the past, extended suction sets were typically made of rigid material, such metal, and, as a consequence were heavy, costly and sometimes difficult to insert into a container of paint or other material to be sprayed. Other forms of extended suction sets typically utilized a steel draw tube extending into the paint reservoir or container, with the draw tube connected via a relatively limp, flexible hose to the pump. When the steel tube-flexible hose type extended suction set was to be moved, it was found necessary to coil the hose and provide for means to support it (and the steel draw tube) in transit, typically requiring extra cost support structure or else ending in an awkward handling situation.

The present invention overcomes shortcomings of both the rigid and the hose type suction sets by providing a preformed suction hose having a predetermined geometry but still being flexible for ease of insertion into the paint reservoir while also maintaining a low weight and cost. Such a preformed resilient hose still suffered from the deficiency of undesirable movement while the pump was in transit. It was found that the unrestrained hose would move away from the pump and undesirably contact nearby surfaces, which is inconvenient. Furthermore, when the pump is moved after painting, such contact would mar the freshly painted surface. To avoid such undesired results, the present invention further includes at least one hook or other retainer to restrain an intermediate portion of the hose from moving away from the pump. When the pump is to be put into operation, the hook is preferably detached from the hose, releasing the hose for movement with respect to the pump to allow insertion in and removal from the paint reservoir.

DETAILED DESCRIPTION

Figure 1:
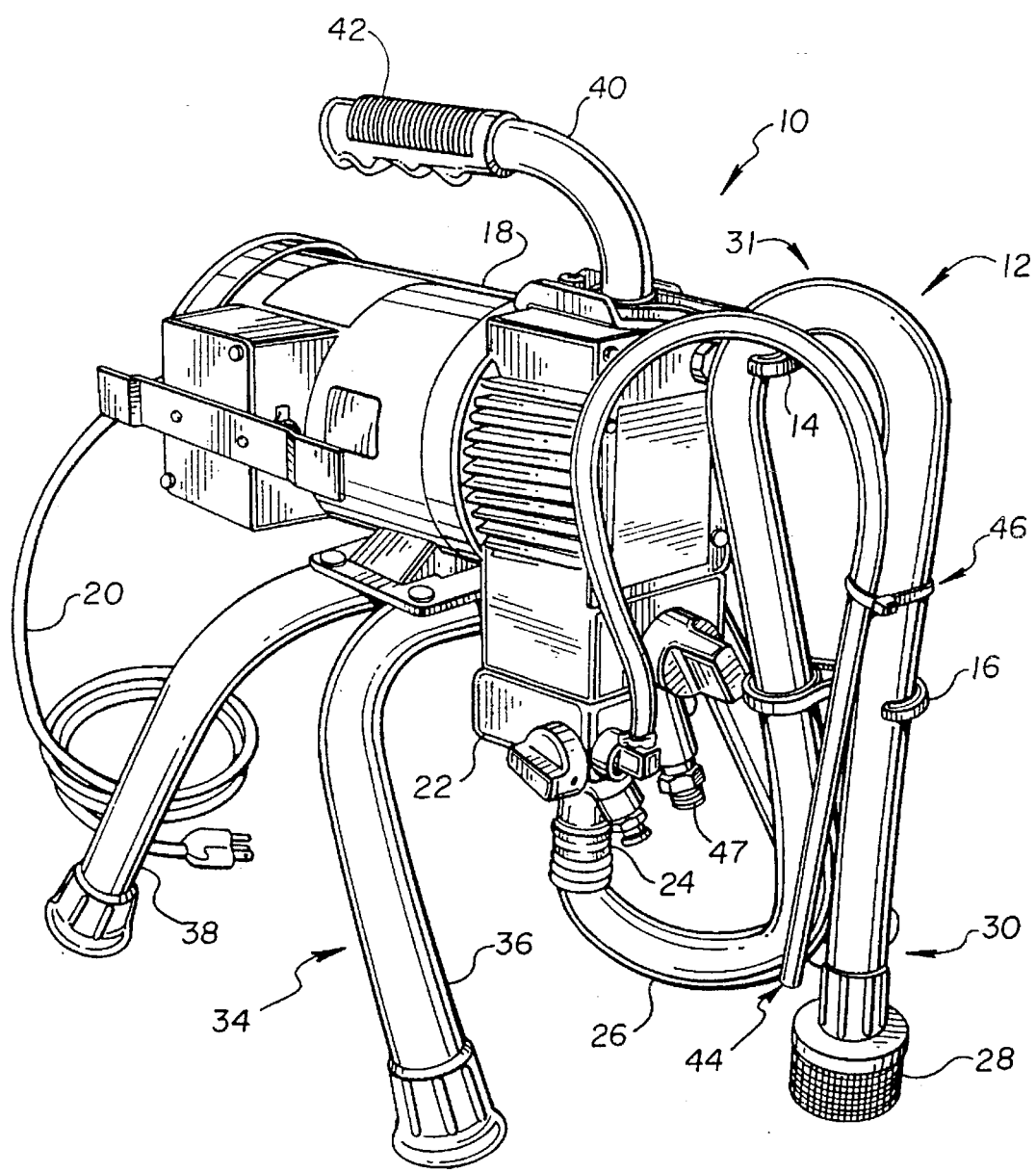
FIG. 1 is a perspective view of a portable paint pump including the suction set retainer of the present invention.
Figure 2:
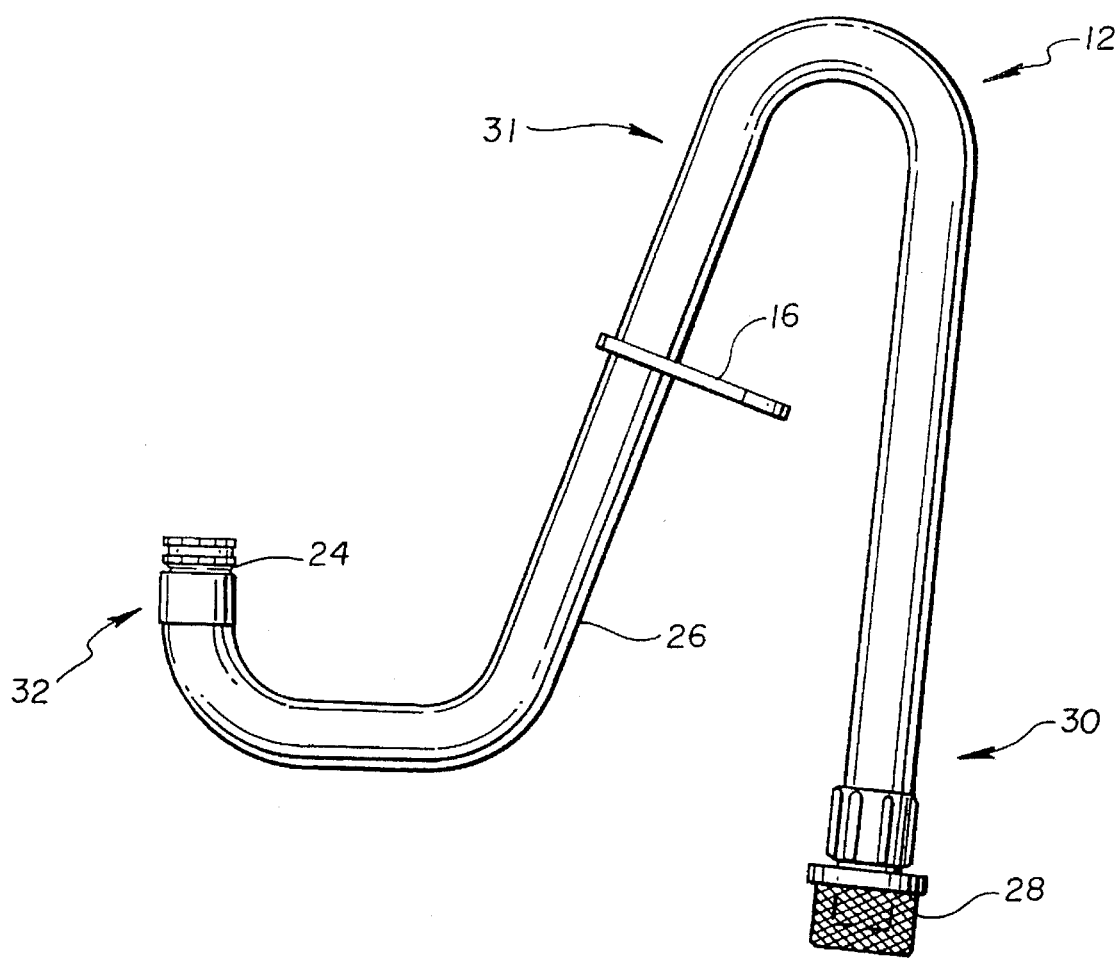
FIG. 2 is side elevation view of a suction set useful in the practice of the present invention.
Figure 3:
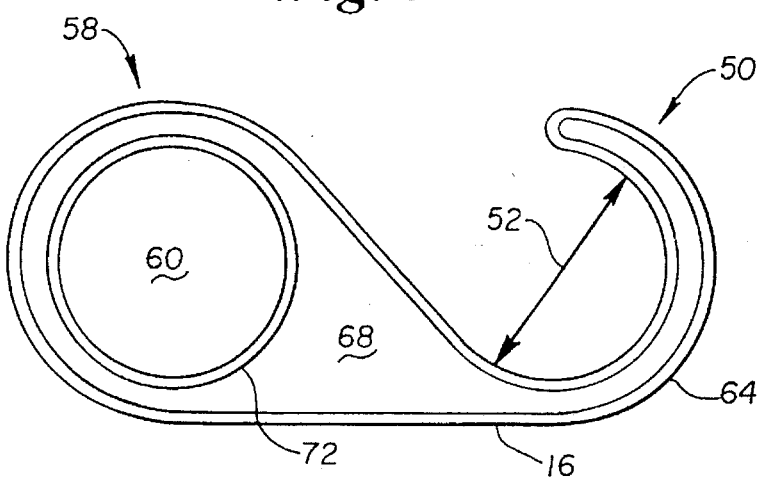
FIG. 3 is a top plan view of a hook for retaining the distal end of the suction set to an intermediate portion off the suction set.
Figure 4:
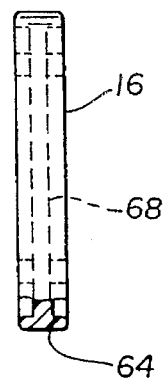
FIG. 4 is an end view of the hook of FIG. 3, partially in section.
Figure 5:
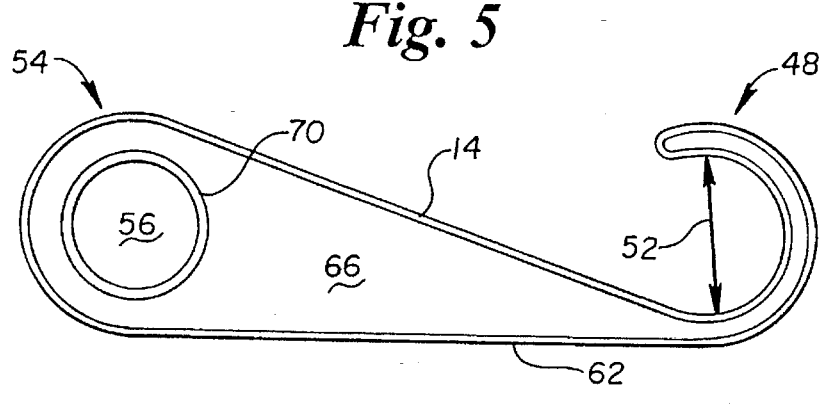
FIG. 5 is top plan view of another hook for retaining the intermediate portion of the suction set to the portable paint pump.
Figure 6:
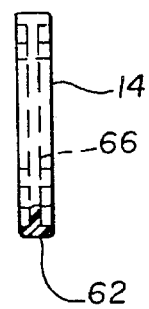
FIG. 6 is an end view of the hook of FIG. 5, partially in section.

Referring now to the Figures, and most particularly to FIG. 1, a perspective view of a portable paint pump 10 may be seen. Pump 10 preferably has an extended suction set 12. Suction set 12 is retained to pump 10 by a pair of hooks 14, 16 in FIG. 1. Referring now also to FIG. 2, suction set 12 may be seen in a relaxed condition with hook 16 attached thereto. Pump 10 preferably includes an electric motor 18 receiving power via a conventional cord set 20. Pump 10 also has a paint pumping section 22 connected via a hose coupling 24 to the extended suction set 12. It is to be understood that the suction set 12 is made up of hose coupling 24, a somewhat flexible hose 26, and a paint strainer 28. Hose 26 is preferably made of a resilient material such as polyurethane and heat formed to assume the shape shown in FIG. 2. It is to be understood that hose 26 is preferably sufficiently rigid to avoid collapse in suctioning paint from a container, while at the same time sufficiently flexible to be moved and positioned by hand when the hooks 14, 16 are released. Hose 26 also has an intermediate portion 31 between the distal and proximal ends 30, 32.

In operation, hooks 14 and 16 are each preferably released, allowing the suction set 12 to assume the shape shown in FIG. 2, freeing the distal end 30 of hose 26 to be inserted into a paint container such as a 5 gallon bucket while a proximal end 32 of hose 26 is retained by coupling 24 to the paint pumping section 22 of pump 10. When it is desired to transport pump 10 to a new location, hooks 14 and 16 are moved into engagement with the hose 26 to retain hose 26 to pump 10 for ease of transport and to avoid distal end 30 from being free to swing away from pump 10 and interfere with convenient and safe transport.

Referring now again to FIG. 1, pump 10 preferably has a base 34 made up of a pair of U-shaped sections 36, 38 forming four legs for supporting pump 10 during operation. Pump 10 also preferably has a handle 40 with a hand grip 42 having a diameter larger than that of handle 40 for manually carrying or transporting pump 10. A return line 44 for priming and cleaning pumping section 22 is preferably formed of flexible tubing and secured to hose 26 by a strap 46.

It is to be understood that pump 10 is connectable to an elongated outlet hose (not shown) via outlet fitting 47 for providing paint under pressure to a hand held spray gun (also not shown).

Turning now also to FIGS. 3–6, the hooks 14 and 16 may be seen in more detail. Each hook is preferably formed of a thermoplastic acetal copolymer material, such as is available from DuPont under the trademark Delrin. It is to be understood that the hooks 14 and 16 shown in FIGS. 3–6 are not shown in the same scale. Each of hooks 14, 16 has an open-ended distal end and a closed proximal end. Open distal end 48 of hook 14 and open distal end 50 of hook 16 preferably each have the same characteristic relaxed diameter 52, sized to provide a snug, but releasable fit with hose 26. Closed proximal end 54 of hook 14 preferably has an aperture 56 sized to provide a sliding fit with handle 40. Hook 14 is retained on handle 40 by grip 42, since aperture 56 is larger than the diameter of handle 40, but smaller than the diameter of hand grip 42. Closed proximal end 58 preferably has an aperture 60 the same as or slightly larger than diameter 52, to retain hook 16 on hose 26 as shown in FIGS. 1 and 2, while permitting manual movement of hook 16 axially and circumferentially with respect to hose 26. Hook 16 is installed on hose 26 before one or both end fittings 24, 28 are secured to hose 26, thus capturing hook 16 on the completed suction set 12 since the fittings on both the distal and proximal ends 30, 32 of hose 26 have larger diameters than the diameter 52 of aperture 60. Because both hooks are captured to the pump 10, they will not be misplaced during operation.

Each of the hooks 14, 16 is preferably formed with an enlarged margin 62, 64 and a reduced central area 66, 68 respectively. Similarly, apertures 56 and 60 each have a respective enlarged margin 70, 72.

It may thus be seen that hook 14 is an intermediate projecting means or member for releasably securing a first or intermediate portion 31 of the flexible suction hose 26 to the portable paint pump 10, such that at least the intermediate portion of the elongated flexible suction hose 26 is restrained from moving away from the pump when hook 14 is engaged with hose 26 at the intermediate portion thereof. It may also be seen that hook 16 is a distal projecting means or member for releasably securing the distal end 30 of hose 26 to the first or intermediate portion 31 of hose Although the present invention has been described with reference to a preferred embodiment, workers skilled in the art will recognize that changes may be made in form and detail without departing from the spirit and scope of the invention. For example, one or both of the projecting means 14, 16 may be formed with another geometry to retain hose 26, as, for example, a fork formed by two spaced apart fingers having a concave recess therebetween to retain hose 26, without departing from the spirit and scope of the invention. Similarly, the proximal ends of either or both of the projecting means 14, 16 may be formed with other geometries, provided that such geometry provides for retention of the respective retaining means to the part on which it is mounted.

What is claimed is:

1. Apparatus for retaining a flexible suction hose to a portable paint pump comprising:
    a) an elongated flexible suction hose having a proximal end connected to an inlet of a portable paint pump and a distal end remote from the pump and free to move with respect to the pump; and
    b) intermediate projecting means having an aperture received around a handle of the pump for releasably securing an intermediate portion of the flexible suction hose to the portable paint pump
   such that at least the intermediate portion of the elongated flexible suction hose is restrained from moving away from the portable paint pump when the intermediate projecting means is engaged with the intermediate portion of the flexible suction hose.

2. The apparatus of claim 1 wherein the intermediate projecting means includes
    i) a closed proximal end surrounding the aperture end secured to the pump, and
    ii) an open-ended distal end sized to retain itself to the intermediate portion of the flexible suction hose.

3. The apparatus of claim 2 wherein the open-ended distal end the intermediate projecting means is hook-shaped.

4. The apparatus of claim 3 wherein the intermediate means is formed of a resilient material.

5. The apparatus of claim 4 wherein the material is a thermoplastic acetal copolymer.

6. The apparatus of claim 1 further comprising a distal projecting means for releasably securing the distal end of the hose to the intermediate portion of the hose.

7. The apparatus of claim 6 wherein the distal projecting means comprises a hook secured to and projecting from the intermediate portion of the flexible suction hose and further wherein the hook is sized to retain itself to the distal portion of the flexible suction hose.

8. The apparatus of claim 6 wherein the distal projecting means is formed with a closed proximal end surrounding the aperture and an open, hook-shaped distal end.

9. The apparatus of claim 8 wherein the distal projecting means is formed of a resilient material.

10. The apparatus of claim 9 wherein the material is a thermoplastic acetal copolymer.

11. A method of securing an elongated flexible suction set to a portable paint pump comprising the steps of:
    a) securing a projecting member with a distal open end to a portable paint pump at a proximal end of the projecting member by receiving an aperture in the projecting member around a handle of the pump; and
    b) engaging the open end of the projecting member with an intermediate portion of a flexible suction hose secured to the portable paint pump
   such that the intermediate portion is restrained from substantial movement with respect to the portable paint pump.

12. The method of claim 11 wherein the projecting member is a first projecting member and the method further comprises the additional steps of:
    c) securing a second projecting member with a distal open end to the intermediate portion of the flexible suction hose; and
    d) engaging the open end of the second projecting member with a distal end of the flexible suction hose
   such that the distal end of the flexible suction hose is restrained from substantial movement with respect to the intermediate portion of the flexible suction hose, thereby preventing substantial movement of the flexible suction hose with respect to the portable paint pump.

13. The method of claim 12 wherein step c) further comprises receiving an aperture in the second projecting member over the hose prior to assembling at least one end fitting on the hose.

14. The method of claim 11 wherein step a) still further comprises retaining the projecting member on the handle by placing a grip on the handle wherein the grip has a diameter greater than the aperture in the projecting member.

15. An improvement for a portable paint pump of the type having an elongated suction set with a flexible suction hose for drawing paint from a container via the flexible suction hose, the improvement in combination with the pump comprising:
    a) a first projecting means having
        i) a proximal end having an aperture received around a handle of the pump and secured to the portable paint pump, and
        ii) a distal end engageable with the flexible suction hose for releasably securing a first portion of the flexible suction hose to the portable paint pump to prevent substantial relative movement between the first portion of the flexible suction hose and the portable paint pump; and
    b) a second projecting means having:
        i) a proximal end secured to the flexible suction hose at the first portion of the flexible suction hose, and
        ii) a distal end engageable with the flexible suction hose for releasably securing a second portion of the flexible suction hose
   such that the flexible suction hose is retained to the portable paint pump when the first and second projecting means are engaged with the flexible suction hose to prevent substantial relative movement of the flexible suction hose with respect to the portable paint pump during transport of the portable paint pump.

16. The improved portable paint pump of claim 15 wherein the distal end of the first projecting means further comprises a hook.

17. The improved portable paint pump of claim 16 wherein the distal end of the second projecting means further comprises a hook.

18. The improved portable paint pump of claim 15 wherein the proximal end of the second projecting means further comprises an aperture.

* * * * *

UNITED STATES PATENT AND TRADEMARK OFFICE
CERTIFICATE OF CORRECTION

PATENT NO. : 5,622,480
DATED : April 22, 1997
INVENTOR(S) : Warren J. Walsh

It is certified that error appears in the above-indentified patent and that said Letters Patent is hereby corrected as shown below:

Col. 1, line 12 insert -- as -- between "such" and "metal"
Col. 3, line 12 insert -- 26 -- after "hose"

Signed and Sealed this

Nineteenth Day of August, 1997

Attest:

BRUCE LEHMAN

Attesting Officer

Commissioner of Patents and Trademarks